United States Patent [19]

Goth

[11] 4,344,642
[45] Aug. 17, 1982

[54] VEHICLE AXLE MOUNTING ARRANGEMENT

[75] Inventor: John Goth, 58 Lough St., Guildford, New South Wales, Australia, 2161

[73] Assignees: John Goth; James Goth, both of New South Wales, Australia; a part interest

[21] Appl. No.: 175,036

[22] Filed: Aug. 4, 1980

[30] Foreign Application Priority Data

Aug. 24, 1979 [AU] Australia ............................... P30180

[51] Int. Cl.³ ............................................. B60G 11/02
[52] U.S. Cl. .................................... 280/682; 280/686; 180/73 TL
[58] Field of Search ............................. 280/682, 686; 180/73 TL, 73 TT

[56] References Cited

U.S. PATENT DOCUMENTS

| | | | |
|---|---|---|---|
| 3,117,799 | 1/1964 | Behnke | 280/682 |
| 3,166,142 | 1/1965 | Frazier | 280/682 |
| 3,469,860 | 9/1969 | Hutchens | 280/682 |
| 3,602,523 | 8/1971 | Poulos | 280/682 |
| 3,841,652 | 10/1974 | Higginson | 280/682 |

FOREIGN PATENT DOCUMENTS

| | | |
|---|---|---|
| 640121 | 7/1950 | United Kingdom . |
| 1503142 | 3/1978 | United Kingdom . |
| 2030088 | 4/1980 | United Kingdom . |

Primary Examiner—Robert H. Song
Attorney, Agent, or Firm—Kirschstein, Kirschstein, Ottinger & Cobrin

[57] ABSTRACT

A suspension system for a double-axle vehicle has been developed which allows load-sharing up and down movement of the axles to occur in a rectilinear manner so as to cope with road surface irregularities, such as potholes. The rectilinear manner of the movement ensures that the axles do not twist and, for example set up driveline vibration in a driven axle. The forward end of the leading spring and the trailing end of the other spring are each carried by a cranked rocker. The intermediate ends of the springs are interconnected by a further rocker. A torsion shaft links one axle to a rocker mounting point, and the free arms of the two cranked rockers are connected by a rod which causes the cranked rockers to move synchronously as the springs move up and down, thereby ensuring rectilinear movement of the springs.

10 Claims, 3 Drawing Figures

VEHICLE AXLE MOUNTING ARRANGEMENT

BACKGROUND OF THE INVENTION

This invention relates to an axle mounting arrangement for a vehicle having a multi-axle group, the axle mounting arrangement providing for load sharing or compensation between the axles when an uneven road surface is encountered. The invention is applicable to vehicles such as trucks, buses or trailers which have two or more axles which are grouped in load sharing relationship, whether the axles be coupled to a single drive system or to a multi-drive system.

Various types of suspension systems have been developed for providing load sharing between axles of a multi-axle group. Some types use air or other fluid to provide compensation for relative (up and down) movement of the axles whilst other types employ a mechanical interconnection system for the axles, so that substantially equal load distribution is maintained. One of the more popular types of load sharing suspension systems employs a rocker between the rear end of the leading axle spring and the forward end of the trailing axle spring. This type of suspension, which is illustrated in and hereinafter described with reference to FIG. 1 of the drawings, is widely used for trailer axle suspensions and, to a lesser extent, on truck chassis for tandem drive and trailing axle fitments. The prior art suspension system referred to has certain merits, but it also has some problems which will be referred to later in this specification.

SUMMARY OF THE INVENTION

The present invention provides an axle mounting arrangement which is similar to the prior art system referred to but which seeks to accommodate larger axle movements whilst still providing for load sharing between the axles of a group.

Also, the present invention seeks to provide an arrangement whereby the angle of the driveline (for example, with respect to the horizontal) as it meets the axle is kept constant despite up and down movement of the spring. The arrangement may also be employed on vehicles having twin steering axles (e.g. front axles) and enables the kingpin angle to be maintained constant.

In general, the driveline from the vehicle engine to a rear axle is not straight. For example, the engine may be installed at an angle of 3 degrees and be connected to a differential unit on the axle by means of a prop-shaft having a universal joint at each end. However, unless the driveline as it enters the differential is parallel or in a compensating plane with respect to the angle of the engine, longitudinal movement of the prop-shaft occurs during driving (since the universal joints are not constant velocity joints). This gives rise to driveline vibration and may quickly lead to failure of driveline components e.g. the differential.

Thus, the present invention provides a mounting arrangement for axles of a vehicle having a multi-axle system, which comprises:

a pair of leaf spring assemblies, each spring assembly supporting an axle, a first rocker non-rigidly connected to the forward end of the leading spring assembly, a second rocker non-rigidly connected to the rearward end of the trailing spring assembly, a further rocker located intermediate the spring assemblies and non-rigidly connected to the rearward end of the leading spring assembly and at an opposite side of a fulcrum of the rocker connected to the leading end of the trailing spring assembly, mounting means for pivotably mounting each rocker to a chassis of the vehicle, a motion transfer link mechanism linking the first and second rockers and a link means for preventing twisting of the axles about their axes, whereby up or down movement of one spring assembly causes rectinlinear movement of the other spring assembly in the opposite direction.

The mounting arrangement in accordance with the invention has been defined above in the context of one end of the axle group, i.e. in relation to one side only of a vehicle, and it will be appreciated that the arrangement will be duplicated to support the two ends of an axle group.

Although the ends of the springs may be attached to the respective rockers by means of shackle pins, it is preferred that the non-rigid connection be achieved by means of a sliding joint in conjunction with a torque rod to locate the spring. Thus, the end of each spring is preferably a sliding fit in a boot provided at the end of an arm of the rocker. The torque rod prevents the spring ends from sliding out of the respective boots. Such an arrangement facilitates flexing of the leaf springs and requires less maintenance.

When the spring is mounted by means of a shackle pin, the torque rod is not required—the shackle pin serving to locate the spring. Usually a single shackle pin is provided at the leading end of the spring, the trailing end being attached by means of a sliding joint.

Generally, the first and second rockers are cranked, for example the two arms preferably subtend substantially a right angle at the fulcrum of the rocker.

Thus in a preferred form, the rocker arms to which the motion transfer link mechanism is attached extend upwards and are interconnected by a horizontal link mechanism in the form of a rigid tie rod pivotally attached to the rocker arms. Alternatively, the motion transfer link mechanism may be a wire which interconnects the first and second rockers. However, in this case it will be appreciated that motion may only be transferred between the rockers when it causes a tensile force in the wire.

However, the present invention is not limited to such specific arrangements. In general, any arrangement wherein pivotal motion of one of said first and second rockers causes pivotal motion in the same sense of the other rocker is encompassed by the present invention. In particular it will be understood that a principal contribution of the invention is firstly that it not only ensures that upward or downward movement of one of the spring assemblies causes concomitant compensating movement in the opposite direction of the other spring assembly (so ensuring that the loading continues to be shared between the two spring assemblies should, for example, a wheel mounted on the leading spring assembly encounter a bump or pothole), but secondly ensures that the up and down motion of the spring assemblies occurs in a rectilinear manner. Thus, in the present invention both ends of each spring move by an equal amount in the same direction, whereby achieving rectilinear motion by ensuring that the planes occupied by the spring assembly are (ignoring flattening or flexing of the spring) always parallel.

The object of this rectilinear movement is to prevent twisting of the axle during the up and down movement, which would otherwise change the angle (for example, with respect to the horizontal) made by the driveline at the point at which it meets the axle and so give rise to driveline vibration. Thus, using the present arrangement the angle of the driveline as it meets the axle is kept constant despite up and down movement of the spring assembly.

The present invention also provides a link means for preventing twisting of the axles and ensuring rectilinear movement during driving and braking, since in practice each axle will generally be provided with brakes and may also be a driven axle. Usually, the link means will be in the form of a torque shaft mounted between the differential of a driven axle and a mounting means, preferably above the differential. If desired, a further torque shaft may also be provided between the second axle and the mounting means. Alternatively, the torque shaft may be adapted to be attached directly to the vehicle chassis.

However, it is to be understood that the link means may be in the form of any other known device for preventing twisting of the axles during drive or braking.

The invention further provides a mounting arrangement as above defined, when in the form of a kit of parts.

The term "axle" is intended to encompass means whereby a wheel may be rotatably mounted to the vehicle chassis.

Because at least one axle of a multi-axle group may be a driven axle, when reference is made herein to connection being made to an "axle" it will be understood that the connection will need be made to a housing containing the rotatable axle shaft. Therefore, in this specification, where the context so requires, the term "axle" is to be read as including an axle housing. Moreover, the term "axle" may include a stub axle on which a wheel is to be mounted, for example when the arrangement is to be applied to a twin-axle steering system having stub axles mounted by kingpins.

DESCRIPTION OF PREFERRED EMBODIMENTS

Figure 1:
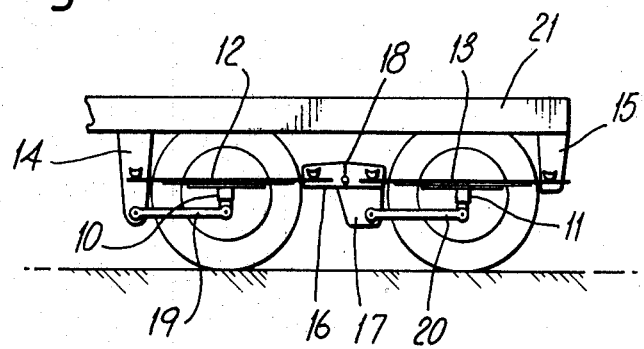
Figure 2:
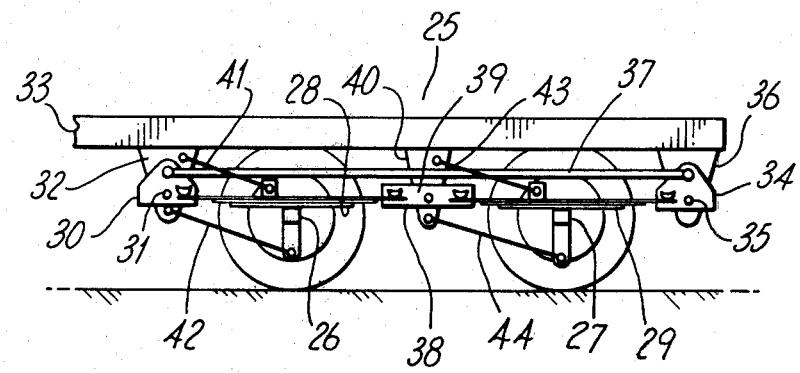
Figure 3:
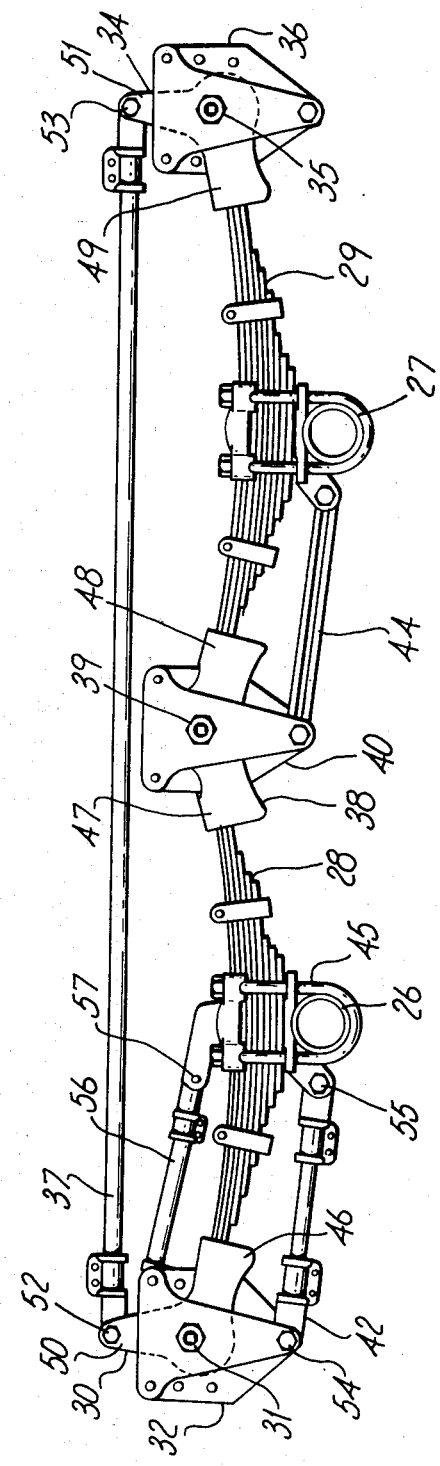

The invention will be more fully understood from the following description of a prior art mounting arrangement for a double-axle system and of a preferred embodiment of a mounting arrangement in accordance with the present invention. The description is given with reference to the accompanying drawings wherein:

FIG. 1 shows a schematic elevation view of a prior art form of axle mounting for a double-axle vehicle, FIG. 2 shows a schematic elevation view of one embodiment of a double-axle mounting arrangement in accordance with the present invention, and FIG. 3 is a detailed elevation of a further arrangement according to the invention.

Referring firstly to the prior art axle mounting arrangement as shown in FIG. 1: This comprises a tandem axle system wherein two axles 10 and 11 are supported by leaf springs 12 and 13. The forward end of the leading spring 12 is connected in sliding relationship to a fixed portion 14 of the vehicle frame or chassis 21, and the rearward end of the trailing spring 13 is similarly connected to a fixed portion 15 of the vehicle frame or chassis. Additionally, the rearward end of the leading spring 12 and the forward end of the trailing spring 13 are connected in sliding relationship to a rocker 16, the rocker being pivotably mounted to a fixed portion 17 of the vehicle and a fulcrum 18 for the rocker being located intermediate the adjacent ends of the springs. Finally, the axles 10 and 11 are connected to the fixed portions 14 and 17 respectively by torque rods 19 and 20.

As hereinbefore mentioned, the above described double-axle mounting arrangement has certain merits, including that of relative simplicity, but it does present two major disadvantages:

1. Load compensation or sharing is achieved only when small undulations are encountered in a road surface traversed by the vehicle, because the rocker 16 provides only limited movement.
2. Because one end of each of the springs is fixed, in terms of height, and the other end of each spring is free to move up and down with movement of the rocker arm 16, the angle of the axles 10 and 11 changes as the vehicle travels over undulations and during power and brake applications.

In order to prevent the occurrence or to reduce the effect of this change in axle angle, some suspension systems of the general type shown in FIG. 1 have been provided with extra torque rods similar to rods 19 and 20, such extra rods being mounted to the top of the axles and being located to run parallel to the lower (corresponding) torque rods.

It has been the experience of the applicant that this adaptation has not proved to be successful, because the top torque rods acts against rotation of the axle caused by movement of the rocker arm, and this results in early failure of the torque rod mounts or breakage of the springs.

The present invention, as exemplified in the following description, seeks to avoid the above problem.

As shown in FIG. 2 of the drawings, a tandem axle mounted vehicle 25 has two axles 26 and 27, the respective axles being mounted to the vehicle by leaf spring assemblies 28 and 29. The forward end of the leading spring 28 is slidably connected to a first rocker 30, and the rocker is pivotably mounted by a fulcrum 31 to a fixed portion 32 of the vehicle chassis 33. The rearward end of the trailing spring 29 is similarly slidably connected to a second rocker 34, such rocker being pivotably mounted via a fulcrum 35 to a further fixed portion 36 of the vehicle.

A motion transfer link 37 couples the first and second rocker 30 and 34 and functions to impart to one of the rockers any pivotal movement which is experienced by the other rocker.

The rearward end of the leading spring 28 and the forward end of the trailing spring 29 are slidably connected to a further rocker 38, at respective sides of a fulcrum 39 of the rocker. The rocker 38 is pivotably mounted to a fixed portion 40 of the vehicle.

A torque shaft 41 and a parallel torque rod 42 pivotably connect the axle and spring assembly 26, 28 to the rocker mount 32, and a similar arrangement of torque shaft 43 and torque rod 44 pivotably connects the axle and spring assembly 27, 29 to the mount 40. It is in fact only necessary to use one of the torque shafts 41 and 43 to ensure the rectilinear movement of the springs. The torque rods 42 and 44 serve to locate the springs.

With the above described mounting arrangement, load sharing is preserved between the axles 26 and 27 during relative (up and down) movement of the wheels which are associated with the axles. Also, the parallel link mechanism which includes the torque shafts and rods 41, 42 and 43, 44 serves to maintain constant the angles of the respective axles during driving and braking.

FIG. 3 shows in more detail an arrangement similar to the arrangement shown schematically in FIG. 2, but with a single torque shaft and two torque rods (the terms "torque shaft" and "torque rod" are synonomous, but the two different terms are used for clarity to distinguish their respective functions). Analogous parts are indicated by the same reference numerals.

As shown, the ends of the spring 28 are slidingly engaged in boots 46 and 47 provided on rockers 30 and 38 respectively. The ends of spring 29 are similarly engaged in boots 48 and 49. The springs are located by means of torque rods 42 and 44 which retain the spring ends in the boots.

Torque rod 42 is pivotally attached at one end to a U-bolt assembly 45 by means of a bolt 55 and pivotally attached at the other end to forward rocker mount 32 by means of a bolt 54. A similar arrangement subsists for the rear spring 29.

Each of the first and second rockers 30 and 34 pivots on a respective fulcrum 31 and 35 and comprises, in addition to boots 46 and 47, respective upright arms 50 and 51 which are interconnected by motion transfer link 37 pivotally attached thereto by bolts 52 and 53.

Axle 26 is supported on forward spring 28 by means of a U-bolt assembly 45. The axle is prevented from twisting during driving or braking by means of an upper torque shaft 56, which is pivotally connected at one end to forward rocker mount 32 and at the other end to assembly 45 by bolt 57. This torque shaft ensures that the movement of the springs is always rectilinear.

It will be appreciated that the arrangement of the present invention may be mounted on trailers or articulated or non-articulated vehicles, which are provided with a group of load sharing axles. When mounted on an articulated vehicle either the power unit (if it has a multi-axle group) or the articulated trailer may be provided with the arrangement. Moreover, none, one or both of the axles of the arrangement may be driven axles.

Furthermore, the arrangement may be used to load-share between the two axles of a twin-axle steering system. Generally, such a steering system will be located at the front of a vehicle and neither of the axles will be driven axles. In this case, it is desirably that the suspension system be such that the kingpin (or the angle of any other means of turning the wheels) be kept constant despite up or down movement and this may be achieved by using an arrangement according to the present invention.

Furthermore, whilst the present invention provides for load compensation between two interconnected spring assemblies, it does not preclude the use in a multi-axle group of further axles and spring assemblies which do not form part of the load compensating arrangement of the present invention.

I claim:

1. A mounting arrangement for axles of a vehicle having a multi-axle system, the vehicle having a chassis, which comprises
   two leaf spring assemblies connected in series, an axle supporting each spring assembly,
   a first rocker non-rigidly connected to a forward end of a leading one of the spring assemblies,
   a second rocker non-rigidly connected to a rearward end of a trailing one of the spring assemblies,
   a further rocker having a fulcrum and being located intermediate the spring assemblies and non-rigidly connected to a rearward end of the leading spring assembly and at an opposite side of the fulcrum said further rocker being non-rigidly connected to a leading end of a trailing spring assembly,
   mounting means for pivotably mounting each rocker to said vehicle chassis,
   a motion transfer link mechanism linking the first and second rockers; and torque rods and at least one torque shaft operative for preventing twisting of the axles about their axes,
   each torque rod being connected at one end of a respective axle and being connected at the other end to means functionally integral with said chassis,
   said at least one torque shaft being connected at one end to one of the axles and being connected at the other end to means functionally integral with said chassis so as to constitute a parallel link mechanism with the respective torque rod; whereby up-down movement of one spring assembly causes rectilinear movement of the other spring assembly in an opposite direction.

2. An arrangement according to claim 1, wherein the motion transfer link mechanism is such that pivotal motion of one of said first and second rockers causes the other rocker to pivot in the same sense.

3. An arrangement according to claim 2, wherein the first and second rockers are each cranked, one arm of each rocker being connected to a respective spring assembly and the other arms of the two rockers being interconnected by means of a rigid tie rod.

4. An arrangement according to either preceding claim, wherein the ends of at least one spring assembly are connected to the respective rocker by means of a sliding joint, an arm of the respective rocker being in the form of a boot into which the end of the respective spring assembly is slideably fitted; and the spring being located by means of a torque rod attached at one end to the spring, and at the other end to the mounting means.

5. An arrangement according to claim 1, wherein at least one spring assembly is connected at one end to the respective rocker by means of a shackle pin.

6. An arrangement according to claim 1, wherein the link means is a torque shaft attached at one end to an axle, and the other end being attached to the mounting means or being adopted for connection to said chassis.

7. An arrangement according to claim 6, wherein one of the axles is a driven axle and comprises a differential, and the torque shaft is disposed between the differential and the mounting means to prevent twisting of the differential during driving or braking.

8. An arrangement according to claim 1, wherein the arrangement forms part of a twin-axle steering system.

9. A vehicle or trailer provided on either side thereof with an arrangement according to claim 1.

10. An arrangement according to claim 1, wherein a torque shaft is provided between each axle and means functionally integral with said chassis.

* * * * *